US006950962B2

(12) United States Patent
Mathias et al.

(10) Patent No.: US 6,950,962 B2
(45) Date of Patent: Sep. 27, 2005

(54) METHOD AND APPARATUS FOR KERNEL MODULE TESTING

(75) Inventors: Daniel R. Mathias, San Jose, CA (US); C. P. Vijay Kumar, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 533 days.

(21) Appl. No.: 09/976,727

(22) Filed: Oct. 12, 2001

(65) Prior Publication Data

US 2003/0074604 A1 Apr. 17, 2003

(51) Int. Cl.[7] .............................................. G06F 11/00
(52) U.S. Cl. ........................ 714/25; 714/38; 719/321
(58) Field of Search ..................... 714/38, 25; 719/321

(56) References Cited

U.S. PATENT DOCUMENTS

| | | | | |
|---|---|---|---|---|
| 5,459,867 A | * | 10/1995 | Adams et al. ............. 719/321 |
| 5,812,848 A | * | 9/1998 | Cohen ....................... 719/331 |
| 6,226,725 B1 | * | 5/2001 | Yarborough ................ 711/170 |
| 2003/0046606 A1 | * | 3/2003 | Johnson et al. ............ 714/25 |
| 2004/0237070 A1 | * | 11/2004 | Roth et al. ................. 717/121 |

OTHER PUBLICATIONS

Hewlett Packard, "Developing Dynamically Loadable Kernel Modules Issue 1.0 HP–UX 11.0", Oct. 12, 1998.*
Vevea, M., "Funtion Prototypes", www.nmr.mgh.harvard.edu/C/prototypes.shtml.
Summit, S., "Function Prototypes", www.eskimo.com/~scs/cclass/notes/sx5b.html.
"Function Prototypes", www.taumoda.com/web/class/day7.html.
Obanos, "Function prototypes", www.codeproject.com/Purgatory/blackozemia.asp.

* cited by examiner

Primary Examiner—Robert Beausoliel
Assistant Examiner—Christopher McCarthy (57) ABSTRACT

A method for testing a service that provides interface functions having no user space interaction and that is runs in a kernel space of an operating system. The method includes loading into the kernel space a dynamically loadable kernel module (DLKM) containing a pseudo device driver having interface commands corresponding to the interface functions of the service to be tested, invoking the interface commands to exercise the interface functions to be tested, and unloading the DLKM module.

26 Claims, 4 Drawing Sheets

METHOD AND APPARATUS FOR KERNEL MODULE TESTING

FIELD OF THE INVENTION

The present invention relates to methods and apparatus for testing computing systems, and more particularly to methods and apparatus for testing kernel modules of computer operating systems.

BACKGROUND OF THE INVENTION

Operating system kernels provide a plurality of services that reside within the kernel. Not all of these services have user space interactions. Nevertheless, kernel developers have a need to test such services to ensure that they perform correctly and efficiently. For example, in one known operating system, a Kernel Event Notification (KEN) system resides within the operating system kernel, but users have no ability to access any of its functions directly. To test such systems in environments as close to those that would actually be encountered in a user installation, the services should be tested when they are loaded along with the rest of the operating system kernel. However, calling code would have to reside in the kernel space to directly invoke the service interface functions.

One approach used to avoid these problems in the past has been to load a pseudo device that handled all systems being tested. The pseudo device code provided additional interface functions between the service interface functions and user space, thus making the service interface functions indirectly accessible from user space. However, for each different service to be tested, new pseudo device code was added to accommodate the interface functions of the new service, and the system rebooted to load the revised version of the pseudo device. Thus, fully testing the different kernel services of an operating system kernel in a situation that is as close as possible to a users environment has been difficult and inconvenient for kernel designers.

SUMMARY OF THE INVENTION

There is therefore provided, in one configuration, a method for testing a service that provides interface functions having no user space interaction and that runs in a kernel space of an operating system. The method includes loading into the kernel space a dynamically loadable kernel module (DLKM) containing a pseudo device driver having interface commands corresponding to the interface functions of the service to be tested, invoking the interface commands to exercise the interface functions to be tested, and unloading the DLKM module.

In another configuration, a medium is provided that has recorded thereon machine-readable instructions configured to facilitate testing of a computing apparatus having a service with interface functions that have no user space interaction and that runs in a kernel space of an operating system. The instructions are configured to instruct the computing apparatus to load into the kernel space a dynamically loadable kernel module (DLKM) containing a pseudo device driver having interface commands corresponding to the interface functions of the service to be tested, invoke the interface commands to exercise the interface functions to be tested; and unload the DLKM module.

In yet another configuration, a computing apparatus is provided that has a processor and a storage device having recorded thereon a kernel of an operating system. The operating system kernel includes a service in kernel space that has interface functions without user space interaction. The computing apparatus is configured to load, into the kernel space, a dynamically loadable kernel module (DLKM) containing a pseudo device driver having interface commands corresponding to the interface functions of the service to be tested, invoke the interface commands to exercise the interface functions to be tested; and unload the DLKM module.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

Flow charts included herein do not necessarily represent a single thread of execution in a single computer process, but rather, in some instances, may represent a sequence of coordinated steps, events, or processes occurring in a plurality of threads. In addition, the flow charts herein should not be interpreted as implying that no other events, steps or processes can occur between those explicitly represented in the drawings.

DETAILED DESCRIPTION OF THE PREFERRED EMBODIMENTS

The following description of the preferred embodiment(s) is merely exemplary in nature and is in no way intended to limit the invention, its application, or uses.

As used herein, the term "kernel space" refers to code executed in a privileged mode, including such code that may be executed on behalf of a less privileged user process. Execution of such code on behalf of a user program or process is performed via invocation of specifically defined function calls, procedures, interrupts, or other predefined interfaces. The separation of kernel space from "user space" is earmarked by a privilege difference that is enforced by hardware, software, or some combination thereof, with software actually setting the privilege level. Generally, after an operating system is booted, a user program cannot raise its privilege level to run in kernel space without being permitted to do so by a program already running with at least the privilege level being sought by the user program or process. If code in a user program or process is executed that requires a service or services provided only to code executed at a privilege level exceeding that of the executing code, the code will not be permitted to access the service or services.

Also as used herein, a "dynamically loaded kernel module" or "DLKM" is a module of executable code that is loaded by an operating system command that can be executed from user space, such as a shell program. It is contemplated, but not necessarily required, that an executing operating system kernel will already be configured to limit permission to load of such a module to one or more system administrators (sometimes referred to as "superusers") and/or defined groups of users, such as kernel developers and test engineers. The DLKM pseudo device drivers referred to herein are given enough privilege by the operating system kernel to run in kernel space, which permits them to interface with both user space and kernel services being tested.

Also as used herein, a "memory" of a computer system or apparatus can be any type of appropriate primary or secondary storage, unless a type of memory is further specified. "Primary" storage includes, for example, random access memory, read only memory, or cache memory. "Secondary" storage includes, for example, hard disks, floppy diskettes, CD-ROMs, and CD-RW. In determining whether a memory was "appropriate," one of ordinary skill in the art would consider, among other things, the speed at which the memory can be accessed and whether it would be sufficient to employ memory that can only be read by the computing apparatus or whether it is also necessary that the computer apparatus be capable of writing to the memory.

Figure 1:
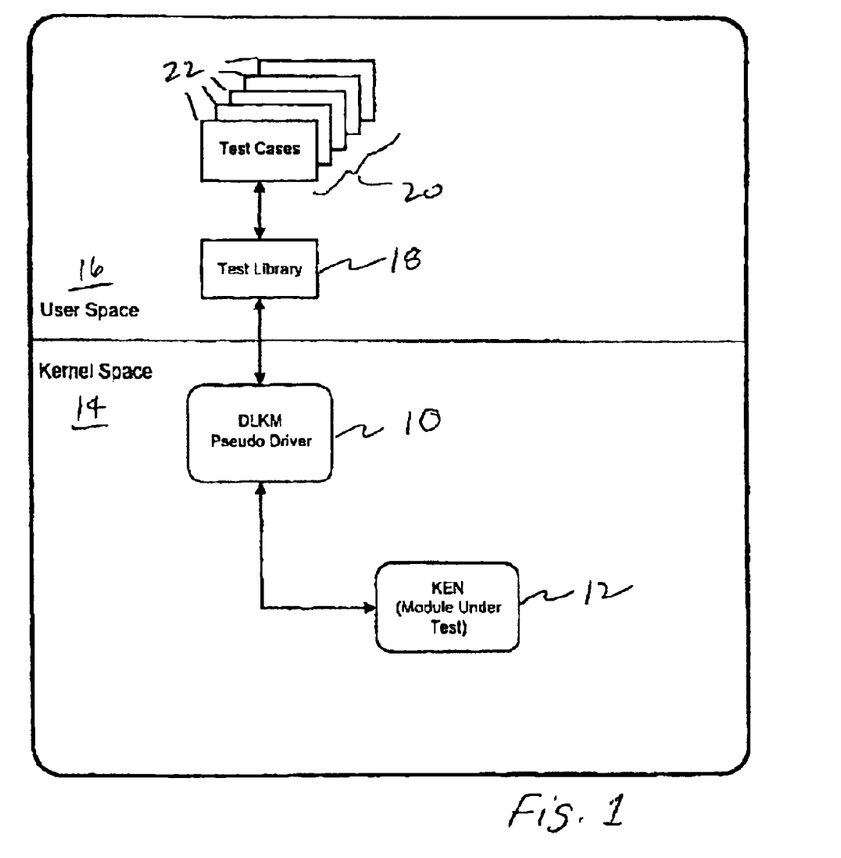
FIG. 1 is a representation of one software test configuration for a kernel module under test.

In one configuration and referring to FIG. 1, a dynamically loadable kernel module (DLKM) 10 is provided to as an intermediary to make interface functions of a module under test 12 (in the example illustrated in FIG. 1, Kernel Event Notification module "KEN") running in kernel space 14 visible to user space 16. A test library 18 is provided in user space to access functions of DLKM 10. Test library 18 is, in turn, utilized by a test program 20 comprising one or more test cases 22 to exercise interface functions of module under test 12.

In one configuration, DLKM 10 is loaded while testing module 12 and unloaded upon completion of the test without leaving residual test code in the operating system kernel. Thus, the operating system kernel need not be recompiled merely to insert the code needed to test module 12, possibly eliminating the need for many repeated recompilations and saving much development time. Module 12 is also tested in an environment that is as nearly identical to the expected field environment as possible, rather than the alternative of testing in user space and then being compiled into the kernel. In addition, test program 20 functions in user space 16, thereby allowing better control over test program 20 while testing module 12 and more convenient manipulation of results into user-friendly reports.

More particularly, a computing apparatus having a processor, a memory, and a storage device is provided. In one configuration and referring to FIGS. 1 and 2, a method is provided for testing a service 12 that provides interface functions having no user space 16 interaction and that is running in a kernel 14 of an operating system. For the processor to be running kernel 14 of the operating system, kernel 14 and service 12 are booted 24 or loaded by the computing apparatus, not necessarily at the same time. A dynamically loadable kernel module DLKM 10 containing a pseudo device driver with interface commands corresponding to service 12 is loaded 26 so that it runs in kernel space 14. A user library 18 is loaded 28 in user space 16. User library 18 has user interfaces that are configured to test the kernel interfaces via DLKM 10 interface commands. For example, DLKM 10 interface commands are ioctl( ) function calls in one configuration. More particularly, the interfaces of user library 18 are callable by a user program 20 and either directly invoke DLKM 10 interface commands or provide additional functionality for testing purposes. As one example, in one configuration, when a particular function in test library 18 is invoked, multiple, timed function calls to one or more DLKM 10 interface commands are made with different values of arguments to exercise the functions of module 12. Values indicative of the success or failure of the calls or of any anomalous conditions encountered during execution are returned in this example. Other functions that may be performed by a test library may be tailored by one skilled in the art as appropriate to the various different modules 12 that may be tested in any particular configuration.

Figure 2:
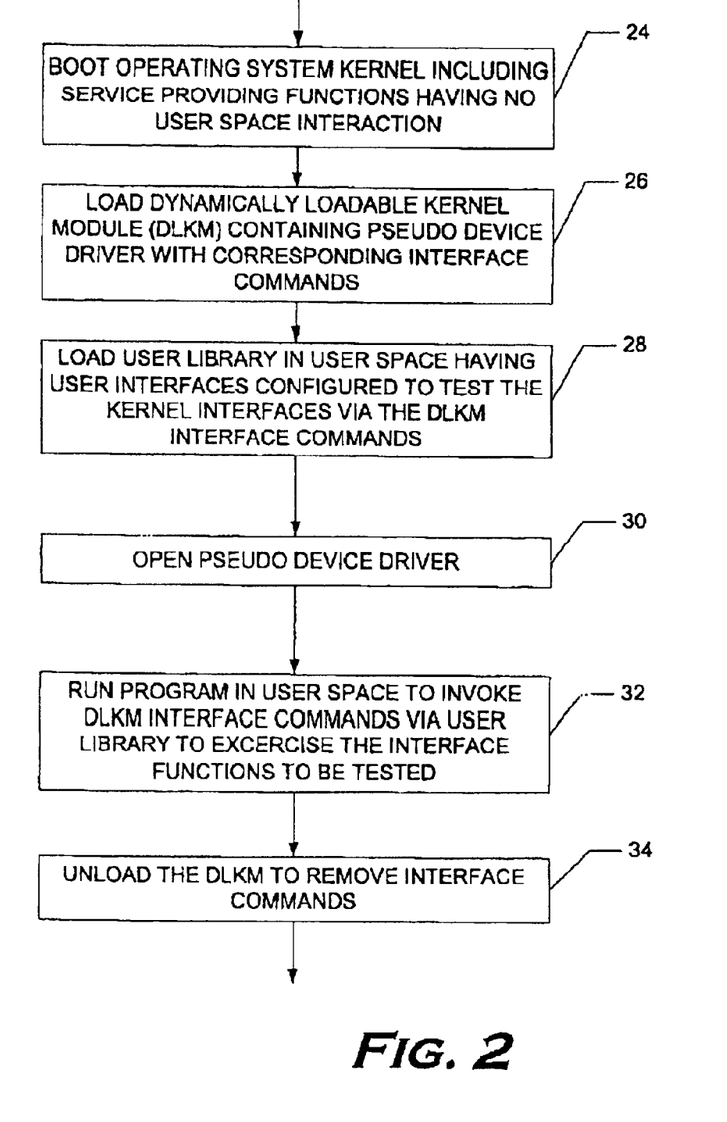
FIG. 2 is a flow chart showing one configuration of a method by which a kernel module is tested.

To test the various interface functions of module 12, pseudo device driver 10 is "opened" by an operating system call from a user program, for example, user program 20. "Opening" a device driver (for example, a special file such as "/dev/device" that is maintained, on some systems, by operating system kernel 14 and which points to special code in kernel 14 that is recognized by kernel 14 as the interface to the "device") causes kernel 14 to make the interface code of device 10 available to a user program such as user program 20. At this point, user program 20 is able to run in user space and invoke interface commands of module 12 that are to be tested. This invocation occurs indirectly, by invoking functions in test library 18 that invoke interface commands of DLKM 10 that in turn, invoke interface functions of module 12 that is being tested. In one configuration, DLKM 10 interface commands are made available only to a privileged user or users, and not to another user or users lacking this privilege, to restrict the individuals and/or programs and/or processes that are able to access DLKM 10 (and thus, indirectly, module 12) from user space. Thus, tests can be run on any module without rebooting the computer. Tests may even be performed while the computer is or continues to be utilized for other purposes and/or by other users.

After a test is completed or at such time as may be desired, DLKM 10 is unloaded 34 so that its interface commands are no longer available Unloading 34 ensures that no residual test code is left in kernel 14. (Test library 18 and test program 22, including test cases 20, are in user space and thus are easily removed or otherwise made inaccessible when they are no longer needed.) Different DLKM 10 modules may be loaded at various times to test any modules 12 in kernel space 14. This approach provides the flexibility to test modules 12 in isolation or in conjunction with one another, at an OEM manufacturer or out in the field, if necessary. Testing may even be performed remotely in one configuration. Furthermore, it is not necessary to recompile kernel 14 to perform tests on different modules, as loading a DLKM 10 that provides an appropriate interface to the module is sufficient. Of course, kernel 14 can still be recompiled as required, if the testing indicates a fault in module 12 or elsewhere for which recompilation is appropriate.

Figure 3:
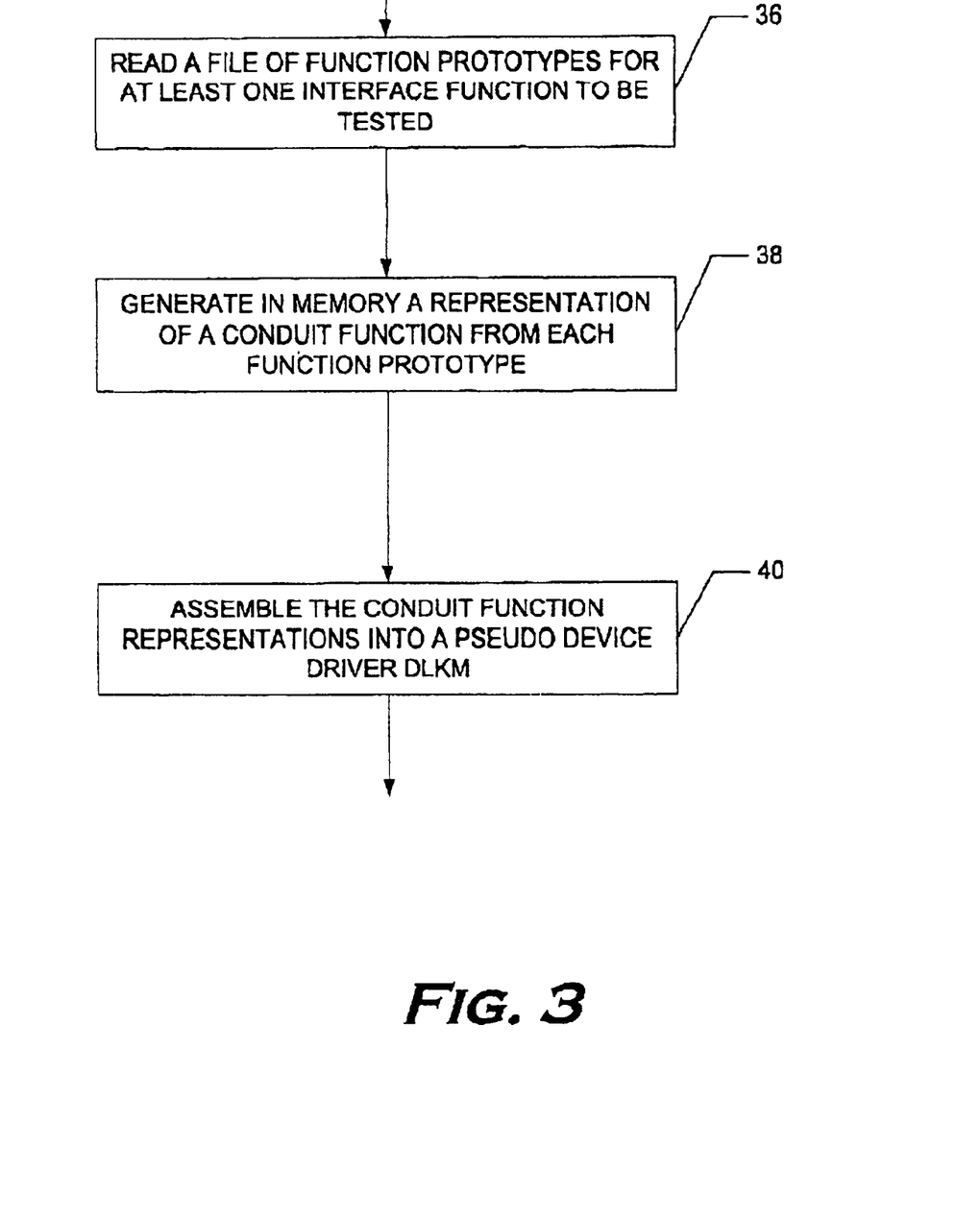
FIG. 3 is a flow chart showing one configuration of a method for automatically generating a pseudo device driver suitable for use in the configuration and method of FIGS. 1 and 2.

In one configuration in referring to FIG. 3, software is provided to automatically produce DLKM 10 from a list of function prototypes (for example, C language function prototypes such as those found in a ".h" header file) of module 12 that are to be tested. These function prototypes are read 36 into a memory of a computer system. (It is not necessary that this computer system be the same as the computer system being tested, but the output of the computer system should be instructions that can be executed by the computer system running the module having the functions to be tested.) The software generates 38, in a memory of the computer system, a representation of a "conduit" function from each function prototype. This generation is straightforward because the software is able to determine, from the function prototypes, what types of arguments and/or results are passed to and/or returned from each function to be tested. The conduit functions themselves need only be functions that provide a user-space accessible invocation as a front end that passes the arguments and/or results to and from the module being tested in kernel space. Representations of the conduit functions (e.g., code that can be compiled for the target machine or that can be directly executed thereon) is then assembled 40, along with any necessary operating system specific code (which, in one configuration, is generated directly from a template), to produce the pseudo device driver. The software that produces the pseudo device driver also, in one configuration, produces the code necessary to wrap the pseudo device driver into a DLKM and a user interface library to access the functions from user space. In configurations having automatically generated DLKMs and/or device drivers, invoking interface commands of the DLKM comprises invoking the conduit functions that are automatically generated. It will be appreciated that configurations in which one or more pseudo device drivers, pseudo device drivers within DLKMs, or DLKMs and user interface libraries are automatically generated from function prototypes enable a test engineer to concentrate on writing only test case programs that access the kernel space module's interface functions via the user space library and the DLKM pseudo device driver. As such, these configurations can significantly reduce the time spent on developing test programs to test kernel space modules.

Figure 4:
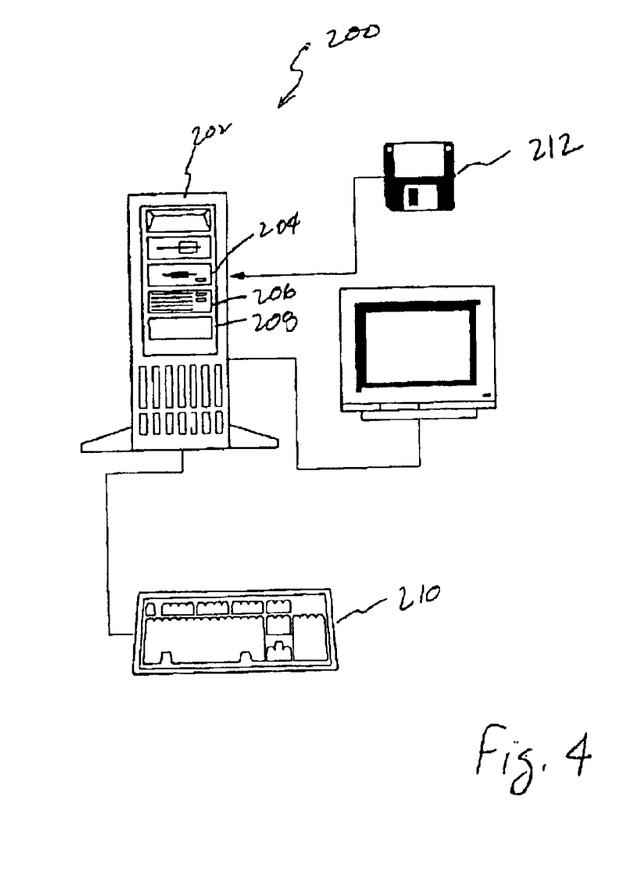
FIG. 4 is a simplified block diagram of a computing system suitable for the configuration shown in FIG. 1 and which is suitable for performing the methods represented by the flow charts of FIGS. 2 and 3.

An example of a computing apparatus 200 configured to operate in accordance with the above description is represented in FIG. 4. Cabinet 202 houses a central processing unit (CPU) and associated random access memory (neither of which are shown separately in FIG. 5, but which are well-known in the art). In addition to random access memory, the CPU also communicates with other memory storage devices, for example, floppy disk drive 204, hard disk drive 206, and CD-ROM drive 208. In one configuration, the operating system, including kernel 14 and module 12 (as shown in FIG. 1), is stored on hard disk drive 206 (or more generally, on one or more memory storage devices or media) and booted by the CPU when power is applied to computer system 200, when a switch is thrown on cabinet 202, when a command is issued from keyboard 210, or at other times in response to software or firmware instructions. To control the multiple processes and process threads, multiple thread schedulers and kernel modules are used. In one configuration, machine readable instructions configured to control computing apparatus 200 to execute the steps and procedures described herein are recorded on one or more media 212, for example, one or more floppy diskettes or CD-ROMS.

The description of the invention is merely exemplary in nature and, thus, variations that do not depart from the gist of the invention are intended to be within the scope of the invention. Such variations are not to be regarded as a departure from the spirit and scope of the invention. In addition, the recitation of "an" element, "one" element, or a specific number of elements (e.g. "two" elements) is not intended to exclude embodiments in which additional elements are present unless the recitation is further qualified by, for example, reciting "only one" element or "not more than" two elements.

What is claimed is:

1. A method for testing a service that provides interface functions having no user space interaction and that is runs in a kernel space of an operating system, said method comprising:

generating a dynamically loadable kernel module (DLKM) containing a pseudo device driver having interface commands corresponding to the interface functions of the service to be tested, the generation being based upon function prototypes corresponding to the interface functions of the service to be tested;

loading the DLKM into the kernel space;

invoking the interface commands to exercise the interface functions to be tested; and unloading the DLKM module.

2. A method in accordance with claim 1 wherein invoking the interface commands further comprises loading a user library having user interfaces configured to test the kernel interfaces via the DLKM interface commands.

3. A method in accordance with claim 2 wherein invoking the interface commands further comprises invoking the user interfaces of the user library via a program running in user space.

4. A method in accordance with claim 1, wherein the generating of the DLKM includes:

reading a file of function prototypes for an interface function to be tested into a memory of a computing apparatus;

generating in the memory of the computer apparatus a representation of a conduit function from each function prototype, the conduit function having a user-space accessible invocation that activates an interface function corresponding to the function prototype from which the conduit function was generated; and assembling the conduit function representations into the pseudo device driver.

5. A method in accordance with claim 4 wherein invoking the interface commands further comprises invoking the conduit functions to invoke the interface commands.

6. A method in accordance with claim 1 wherein unloading the DLKM module comprises removing the interface commands corresponding to the interface functions of the service to be tested, so that the interface commands are no longer available.

7. A method in accordance with claim 1 wherein the interface commands of the DLKM module are accessible only to a privileged user or users, and not to another user or users.

8. A method in accordance with claim 1 wherein invoking the interface commands to exercise the interface functions to be tested comprises opening the pseudo device driver, and invoking the interfaces of the device driver.

9. A machine readable medium having recorded thereon machine readable instructions, execution of which by a machine facilitates testing of a computing apparatus having a service with interface functions that have no user space interaction and that runs in a kernel space of an operating system, said machine readable medium comprising one or more code segments that represent instructions to:

generate a dynamically loadable kernel module (DLKM) containing a pseudo device driver having interface commands corresponding to the interface functions of the service to be tested, the generation being based upon function prototypes corresponding to the interface functions of the service to be tested;

load the DLKM into the kernel space;
invoke said interface commands to exercise the interface functions to be tested; and
unload said DLKM module.

10. A medium in accordance with claim 9 wherein to invoke the interface commands, said machine readable medium further comprises one or more code segments that represent a user library having user interfaces, execution of which by the machine tests the kernel interfaces via said DLKM interface commands.

11. A medium in accordance with claim 10 wherein to invoke said interface commands, said machine readable medium further comprises one or more code segments that represent instructions to invoke said user interfaces of the user library via a program running in user space.

12. A medium in accordance with claim 9 wherein said machine readable medium further comprises one or more code segments that represent instructions to:
read a file of function prototypes for an interface function to be tested into a memory of said computer apparatus;
generate in the memory of the computer apparatus a representation of a conduit function from each function prototype, said conduit function having a user-space accessible invocation that activates an interface function corresponding to the function prototype from which said conduit function was generated; and
assemble said conduit function representations into said pseudo device driver.

13. A medium in accordance with claim 12 wherein to invoke the interface commands, said machine readable medium further comprises one or more code segments that represent instructions to invoke said conduit functions.

14. A medium in accordance with claim 9 wherein the interface commands of the DLKM module are configured to be accessible only to a privileged user or users, and not to another user or users.

15. A computing apparatus comprising a processor and a storage device having recorded thereon a kernel of an operating system that includes a service in kernel space that has interface functions without user space interaction, said computing apparatus configured to:
generate a dynamically loadable kernel module (DLKM) containing a pseudo device driver having interface commands corresponding to the interface functions of the service to be tested, the generation being based upon function prototypes corresponding to the interface functions of the service to be tested;
load the DLKM into the kernel space;
invoke said interface commands to exercise the interface functions to be tested; and
unload said DLKM module.

16. A computing apparatus in accordance with claim 15 wherein to invoke the interface commands, said computing apparatus is further configured to load a user library having user interfaces that are configured to test the kernel interfaces via said DLKM interface commands.

17. A computing apparatus in accordance with claim 16 wherein to invoke said interface commands, said computing apparatus is further configured to invoke said user interfaces of said user library via a program running in user space.

18. A computing apparatus in accordance with claim 15 wherein to generate the DLKM, the computing apparatus is further configured to:
read a file of function prototypes for an interface function to be tested into a memory of said computing apparatus;
generate in said memory of said computing apparatus a representation of a conduit function from each function prototype, said conduit function having a user-space accessible invocation that activates an interface function corresponding to the function prototype from which said conduit function was generated; and
assemble said conduit function representations into said pseudo device driver.

19. A computing apparatus in accordance with claim 18 wherein to invoke said interface commands, said computing apparatus is further configured to invoke said conduit functions that invoke the interface commands.

20. A computing apparatus in accordance with claim 15 wherein to unload said DLKM module, said computing apparatus is configured to remove said interface commands corresponding to the interface functions of the service to be tested, so that said interface commands are no longer available.

21. A method of generating a kernel module containing a pseudo device driver having interface commands corresponding to interface functions of a service to be tested, the service being arranged to run in a kernel space of an operating system and to provide one or more interface functions none of which exhibits user space interaction, said method comprising:
providing one or more function prototypes corresponding to the one or more interface functions of the service to be tested; and
generating a dynamically loadable kernel module (DLKM) containing the pseudo device driver based upon the one or more function prototypes of the service to be tested.

22. A method in accordance with claim 21, wherein:
the providing one or more function prototypes includes the following,
aggregating the one or more function prototypes in a file associated with the service; and
the generating of the DLKM includes the following,
reading the file into a memory of a computing apparatus,
generating in the memory of the computer apparatus representations of one or more conduit functions for the one or more function prototypes, respectively, the one or more conduit functions having user-space accessible invocations that activate the corresponding interface functions, and
assembling the one or more conduit function representations into the pseudo device driver.

23. A machine readable medium having recorded thereon machine readable instructions, execution of which by a machine generates a kernel module containing a pseudo device driver having interface commands corresponding to interface functions of a service to be tested, the service being arranged to run in a kernel space of an operating system and to provide one or more interface functions none of which exhibits user space interaction, said machine readable medium comprising one or more code segments that represent instructions to:
provide one or more function prototypes corresponding to the one or more interface functions of the service to be tested; and
generate a dynamically loadable kernel module (DLKM) containing the pseudo device driver based upon the one or more function prototypes of the service to be tested.

24. A medium in accordance with claim 23 wherein:
to provide the one or more function prototypes, said machine readable medium further comprises one or more code segments representing instructions to do the following, aggregate the one or more function prototypes in a file associated with the service; and to generate the DLKM, said machine readable medium further comprises one or more code segments representing instructions to do the following, read the file into a memory of a computing apparatus, generate in the memory of the computer apparatus representations of one or more conduit functions for the one or more function prototypes, respectively, the one or more conduit functions having user-space accessible invocations that activate the corresponding interface functions, and assemble the one or more conduit function representations into the pseudo device driver.

25. A computing apparatus comprising a processor and a storage device having recorded thereon a kernel of an operating system that includes a service in kernel space that has interface functions without user space interaction, said computing apparatus configured to:

provide one or more function prototypes corresponding to the one or more interface functions of the service to be tested; and generate a dynamically loadable kernel module (DLKM) containing the pseudo device driver based upon the one or more function prototypes of the service to be tested.

26. A computing apparatus in accordance with claim 25 wherein:

to provide the one or more function prototypes, said computing apparatus further includes operability to do the following, aggregate the one or more function prototypes in a file associated with the service; and to generate the DLKM, said computing apparatus further includes operability to do the following, read the file into a machine readable memory, generate in the machine readable memory of the computer apparatus representations of one or more conduit functions for the one or more function prototypes, respectively, the one or more conduit functions having user-space accessible invocations that activate the corresponding interface functions, and assemble the one or more conduit function representations into the pseudo device driver.

* * * * *

UNITED STATES PATENT AND TRADEMARK OFFICE
CERTIFICATE OF CORRECTION

| | | |
|---|---|---|
| PATENT NO. | : 6,950,962 B2 | Page 1 of 1 |
| APPLICATION NO. | : 09/976727 | |
| DATED | : September 27, 2005 | |
| INVENTOR(S) | : Daniel R. Mathias et al. | |

It is certified that error appears in the above-identified patent and that said Letters Patent is hereby corrected as shown below:

In column 6, line 3, in Claim 1, after "that" delete "is".

In column 8, line 33, in Claim 22, after "providing" insert -- of --.

Signed and Sealed this

Eleventh Day of August, 2009

David J. Kappos
*Director of the United States Patent and Trademark Office*